(12) United States Patent
Ball

(10) Patent No.: US 9,630,126 B1
(45) Date of Patent: Apr. 25, 2017

(54) HIGH EFFICIENCY FLUID SEPARATION DEVICE

(71) Applicant: KBK Industries, LLC, Rush Center, KS (US)

(72) Inventor: Will D. Ball, Bixby, OK (US)

(73) Assignee: KBK Industries, LLC, Rush Center, KS (US)

( * ) Notice: Subject to any disclaimer, the term of this patent is extended or adjusted under 35 U.S.C. 154(b) by 72 days.

(21) Appl. No.: 14/253,026

(22) Filed: Apr. 15, 2014

(51) Int. Cl.
*B01D 19/00* (2006.01)
*B01D 17/02* (2006.01)

(52) U.S. Cl.
CPC ...... *B01D 17/0211* (2013.01); *B01D 17/0214* (2013.01); *B01D 19/00* (2013.01)

(58) Field of Classification Search
CPC B01D 17/0211; B01D 17/0214; B01D 19/00; B01D 19/0015; B01D 19/0042; B01D 19/0031; B01D 17/00; B01D 17/02
USPC .................................................. 96/155–220
See application file for complete search history.

(56) References Cited

U.S. PATENT DOCUMENTS

| | | | | |
|---|---|---|---|---|
| 2,530,054 A | * | 11/1950 | Gordon | B01D 17/00 210/195.1 |
| 3,273,318 A | * | 9/1966 | Meyer | E21B 43/34 96/185 |
| 4,139,463 A | * | 2/1979 | Murphy | B01D 17/02 210/254 |
| 4,428,839 A | | 1/1984 | Davies et al. | |
| 4,622,118 A | | 11/1986 | Chimenti et al. | |
| 4,880,533 A | | 11/1989 | Hondulas | |
| 5,122,280 A | | 6/1992 | Russell et al. | |
| 5,378,376 A | | 1/1995 | Zenner | |
| 5,840,198 A | * | 11/1998 | Clarke | B01D 17/0211 210/519 |
| 6,337,023 B1 | | 1/2002 | Broussard, Sr. et al. | |
| 7,157,007 B2 | | 1/2007 | Frankiewicz et al. | |

\* cited by examiner

*Primary Examiner* — T. Bennett McKenzie
(74) *Attorney, Agent, or Firm* — Leydig, Voit & Mayer, Ltd.

(57) ABSTRACT

A gun barrel tank for treating raw crude oil mixtures. The fluid mixture enters through a degassing boot where gas is separated from the liquid. The liquid travels through a central column to a horizontal hydraulic distributor located in the lower area of the tank, first entering a central distributor trough, then passing into open bottom horizontal inverted lateral troughs and finally out through a plurality of metering orifices provided near the top edges of the lateral troughs to provide uniform distribution of the liquid in the tank. A circular oil collection trough provided at the top of the tank has a plurality of V-shaped notches on its top edge over which oil flows into an oil collection trough to provided uniform collection of the separated crude. A circular water collector in the bottom of the tank removes separated water, and solids are removed from the bottom of the tank.

16 Claims, 2 Drawing Sheets

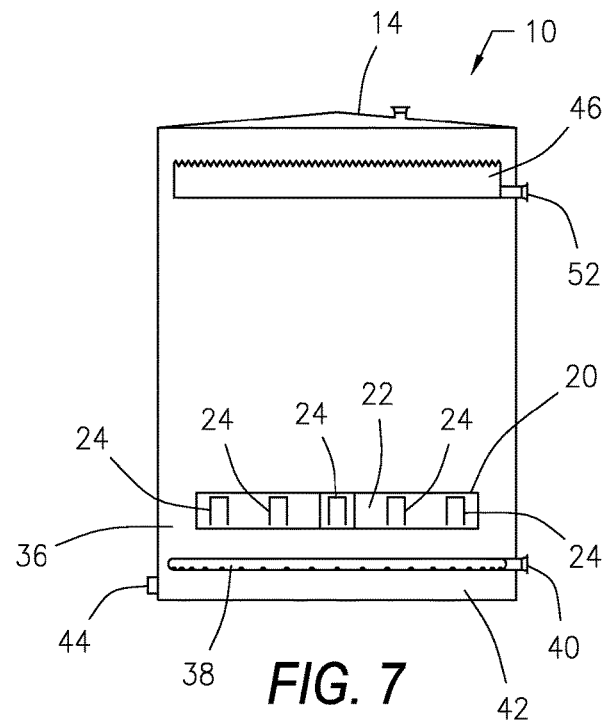
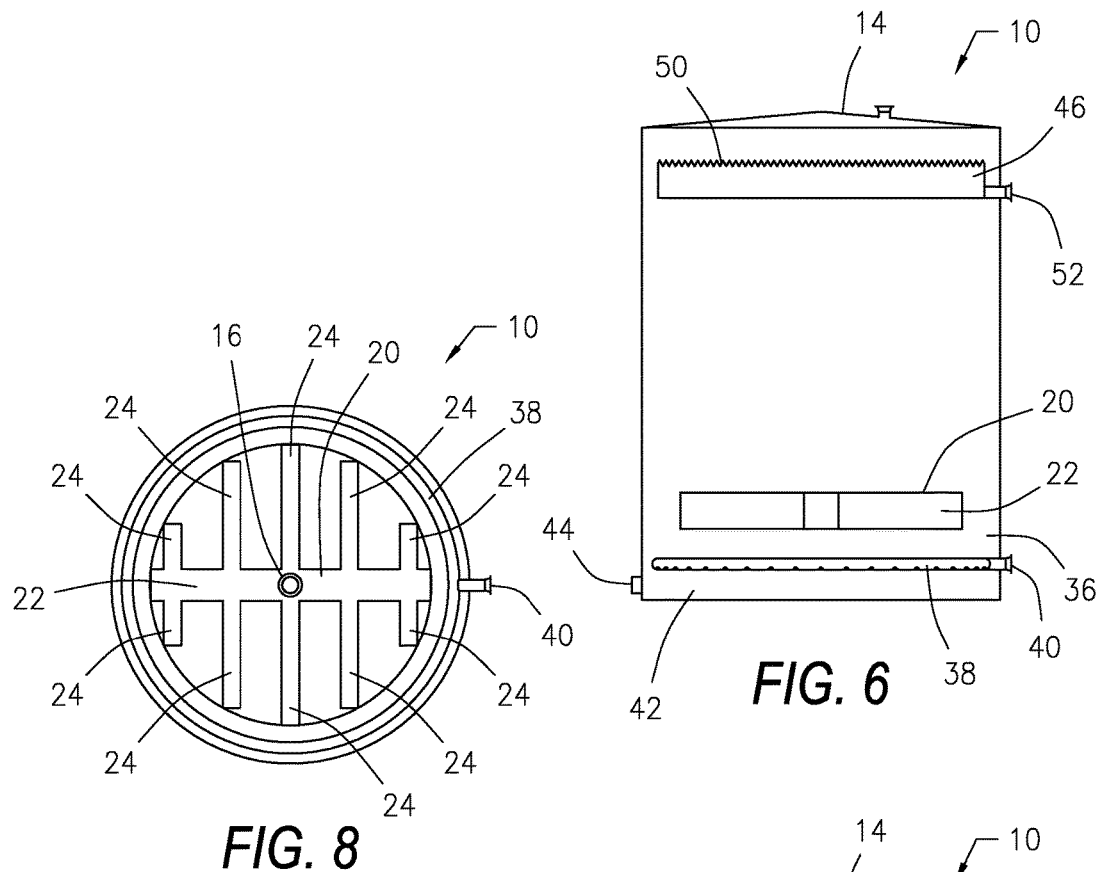
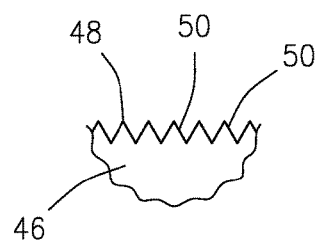

HIGH EFFICIENCY FLUID SEPARATION DEVICE

BACKGROUND OF THE INVENTION

1. Field of the Invention

The present invention is an improved cylindrical tank that is known in the petroleum industry as a gun barrel. The present gun barrel is used to separate small amounts of water from large amounts of crude oil. The improvements in the gun barrel include features that create more uniform distribution of inlet fluid within the tank and more uniform collection of outlet fluid in the form of oil from the tank.

2. Description of the Related Art

Oil-water separation became a necessity in Drake's first well in Titusville, Pa. As that well began to water out, a system to separate the water was needed. The so-called "gun barrel" tank was developed to meet that need.

Gun barrel designs took a couple of generations to mature. But when they finally did, they became a standard of the industry that has survived ever since. The gun barrel tank, which is also called a "wash tank" in some circles, became universally applied when the industry needed to separate water and oil. The gun barrel design focuses on separating small amounts of water from large amounts of oil.

In the earliest days, most wells produced enough natural gas to cause the early gun barrel designers to add a liquids-gas separator to their tank designs. Removing the gas before the oil and water entered the gun barrel was observed to be necessary since the gas that evolves from liquids tends to stir or mix the water and oil. Even then, i.e. approximately 150 years ago, it was obvious that mixing is detrimental to the process of separating water and oil. So, a gas separator was added to the gun barrel tank. It was referred to as a "degassing boot", or simply a "gas boot". As the industry grew, the gun barrel became well known as the preferred way to pre-condition crude oil so it could be refined.

For the next 150 years, the gun barrel remained essentially unchanged, staying true to its original very simple design. That design used a pipe inserted through the roof of a standard tank and extended a few feet above the roof to form the gas boot. The pipe extended down to a few feet above the tank bottom. A horizontal plate was welded onto or bolted to the bottom of the pipe near its bottom to distribute the inlet oil throughout the bottom of the tank. Because of being lighter in density, the oil would rise through the water and the water in the tank was thought to "wash" the water out of the oil. The oil continued to rise within the tank until it reached an oil layer located above the water. Most folks believed that the oil layer needed to be sufficiently large enough to contain all of the crude oil produced in a period of about 8-24 hours.

As time passed, more and more people accepted the fact that the depth of the oil layer needed to be based on the density difference between the oil and the water. It was found that lighter oil could be dehydrated in fewer than eight hours of calculated oil retention time in a gun barrel, while heavier oil might require 24 hours or more.

Also, some gun barrel manufacturers, bowing to the wishes of their customers, placed the gas boot and down corner outside the tank to minimize the corrosive effects of salt water located within the tank. When a tank was configured this way it was often referred to as a wash tank. When the gas boot was located concentrically on top of the tank, the tank was generally referred to as a gun barrel. Although the tanks look different, the functional results are the same.

This design remained unchallenged for nearly 75 year, and was the standard of the industry until the 1930's when heater treaters were developed to lower crude oil viscosity by applying heat to the mixture. These heater treaters were pressure vessels designed to separate and capture the otherwise vented natural gas stream.

But in fields where gas production was non-existent or was depleted, the gun barrel was, and still is, the system of choice.

Finally, in the 1970's, when the price of crude oil soared from about $5.00/barrel to around $45/barrel, this oilfield standard was challenged by some of the industry's more forward thinking oilfield research and develop (R&D) laboratories. The results from these labs were startling and very disappointing.

Report after report showed that the hydraulic efficiency of the traditional wash tank or gun barrel designs was extremely low, most ranging from 1% to 3%. Bigger tanks had been thought to be better for separating oil from water, but in most cases, test showed that bigger tanks actually performed worse. Oil industry separation designs had always been assumed to work as they should, but these studies proved otherwise.

One problem with previous gun barrel designs is that it had always been presumed that fluids naturally distributed uniformly and flowed through the entire gun barrel tank uniformly. Instead, these same studies proved that the oil and water predictably take the paths of least resistance.

Oil and water actually move through the gun barrel tank in the shortest, narrowest, non-uniform flow paths of least resistance, between the fluid inlet and the fluid outlets. Retention time studies proved that only a very small portion of the storage volume of the gun barrel tank was actually in the flow paths of the water and oil. In some tests the inlet crude was found to actually only stay in the oil phase for a matter of minutes, and the water for even less time. In a few test the water retention time was just a few seconds. When compared with the original supposition that oil retention times were hours long, these tests were quite eye opening, and contrary to the assumptions made about gun barrel performance for over 100 years.

At that point, skepticism about the wisdom of the past began to set in. New designs began to shift away from the assumed oil retention time of the past. Designers began to look for new ways to increase fluid distribution and collection systems to optimize the use of the entire vessel, and overall separation efficiency. Every conceivable idea was tried, and surprisingly, most failed.

From this work, more and more researchers agreed that as fluid flow and distribution were rendered more uniform, the separation results were more and more dramatic.

Eventually more and more researchers agreed that truly uniform distribution of incoming crude and emulsion through the entire cross section of the oil layer would increase retention times enormously. In some cases the results were 35 times better.

The conclusions of these studies proved that designs based on fluid dynamics could produce amazing results. When the design is optimized, the size of any wash tank or gun barrel tank will be much smaller and this will reduce the capital investment in the tank. Also, these new designs will produce better results regardless of the influences of outside of conditions such as summer-winter temperature swings. And surprisingly, researchers discovered that process capacity and separation efficiency increased even more when the inlet crude and emulsion stream is not washed through the water phase, but is instead introduced into the oil rich emulsion layer located just above the water phase. In fact, some studies showed that the inlet emulsion actually absorbs water from the water layer, increasing the BS&W concentration of the mix entering the bottom of the oil layer in a gun barrel.

These tests were conducted in the last great "oil boom" which started with the Arab oil embargo in the early 1970's and ended in 1985. While a great deal of the wisdom gained in those years was lost through "bust" cycle attrition of personnel and layoffs, the present invention used this knowledge in the present gun barrel design.

Too little effort had been given to the selection of oil process equipment in the past by oil companies, resulting in millions of dollars of unnecessary costs. Many oil operators simply pick up the phone and order a separator, a gun barrel or heater treater, a couple of oil tanks, a water tank, or whatever they ordered last time, even though the equipment they are ordering is not efficient at separating oil, gas, and solids from the produced oil. Very few equipment suppliers do any vessel sizing or application engineering for lease production equipment; most will simply ask the operators what they want and will fill the order because the suppliers presume that the operators knows what they want and need.

However, the new technologies we currently have available are completely different than the technologies available when our predecessors got away with a more casual approach to selecting new process equipment. Most of the equipment we use today was designed in a different time for different production conditions such as higher gas to oil ratios (GORs), much lower water cuts, higher pressures, less stable emulsions, and lower amounts of iron sulfide, sand, $CO_2$, paraffin, etc. Not too far in the past, the norm was high oil volumes and very little water. Today, most operating conditions are just the opposite, with high water volumes and little oil. It shouldn't be too surprising that different conditions demand different equipment designs. It also shouldn't be too surprising that yesterday's process equipment designed for low water cut conditions doesn't fit well in today's higher water cut operations. Thus, use of older type separation equipment costs the oil industry a fortune each year.

The present invention is an improved gun barrel that is much more efficient, and this increase efficiency facilitates a smaller in size tank than traditional gun barrel tanks. The present invention was engineered with the knowledge that efficient and effective physical separation of oil from water in a gun barrel is a function of efficient fluid distribution and efficient fluid collection which then will result in longer retention time within a given size tank.

The required separation time in any application can be calculated using Stokes Law. However, the key to oil-water separation in facility design is to focus on distribution and collection, which result in real retention time improvements and far better overall separation.

The present invention focuses on these two areas. The invention employs a distributor trough designed to slow the inlet fluid velocity and provide uniform distribution of incoming flow into lateral distribution metering troughs located in the emulsion layer of the tank to provide uniform distribution of incoming fluids. The invention also employs a circular oil collection trough with a plurality of V-shaped notches provided on its edge that insure uniform collection of oil into the oil collection trough from around the entire circumference of the gun barrel tank. These two features make the present gun barrel extremely efficient at separating water from the oil.

SUMMARY OF THE INVENTION

The present design employs a unique dual phase hydraulics approach to achieve uniform distribution and collection of the crude oil. As in all gun barrels or wash tanks, the inlet fluid in the present tank is first degassed in a degassing boot. The gas free liquid then flows vertically down into the tank and then into a very large horizontal hydraulic distributor. This fluid distributor is comprised of a series of horizontal inverted troughs, open on the bottom, closed on all other sides. The distributor trough is designed to slow the inlet fluid velocity so uniform distribution into lateral distribution and metering troughs is achieved. The lateral distribution and metering troughs are provided with a plurality of oil and emulsion distribution metering orifices near their top edges.

The present design balances flow, internal distribution, and trough interface depression to achieve a uniform pressure drop across the hundreds of oil and emulsion distribution metering orifices.

The lateral distribution and metering troughs are strategically located in the lower area of the tank in the BS&W layer where all emulsion breaking chemicals naturally concentrate. Typically, emulsion breaking chemicals are introduced into the incoming stream at a location upstream of the gun barrel.

The internal trough interface is depressed by the proper sizing of the metering holes. This creates a uniform pressure drop across every metering orifice, assuring uniform and identical flow through each and every orifice. The result is very uniform oil distribution throughout the entire cross section of the gun barrel tank.

With uniform distribution accomplished, oil rises vertically and uniformly through the emulsion layer where water droplet coalescing can occur. Larger coalesced water droplets fall rapidly downward through the emulsion layer into the water phase.

The oil rises at the minimum velocity, maximizing retention time. The lower rise rate of the oil promotes the separation of smaller water droplets. Larger and heavier water droplets can now counter-flow downward and into the water layer below, completing the dehydration process to a degree not heretofore thought possible in atmospheric gun barrel tank systems.

As the oil nears the top of the oil layer, it is collected uniformly throughout the entire circumference of the tank employing a circular oil collection trough, thus maximizing the utilization of the tank and completing the dehydration process. The entire top edge of the circular oil collection trough is in the form of a plurality of V-shaped notches that insure uniform collection of oil into the oil collection trough from around the entire circumference of the gun barrel tank.

BRIEF DESCRIPTION OF THE DRAWINGS

FIG. 6 is the gun barrel tank of FIG. 1 shown with the central inlet pipe and the lateral distribution and metering troughs removed from the horizontal hydraulic distributor.

FIG. 7 is the gun barrel tank of FIG. 6 shown with the lateral distribution and metering troughs attached to the horizontal hydraulic distributor.

FIG. 8 is a cross section view taken along line 8-8 of FIG. 1.

FIG. 9 is an enlargement of the area within circle 9 of FIG. 1.

DETAILED DESCRIPTION OF THE PREFERRED EMBODIMENT

Figure 1:
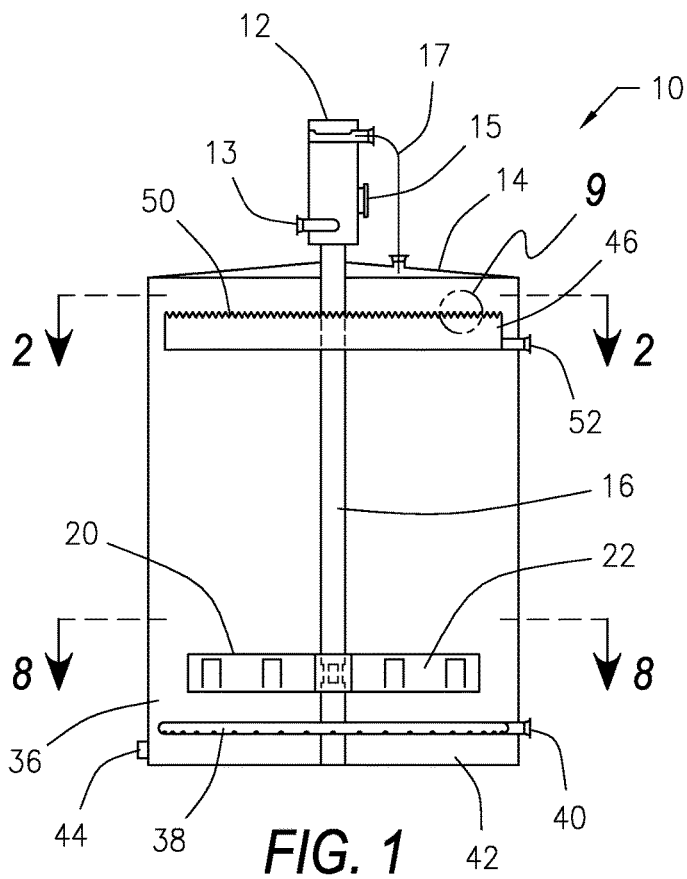
FIG. 1 is a front plan diagram of a gun barrel tank that is constructed in accordance with a preferred embodiment of the present invention, with the internal features shown.
Figure 2:
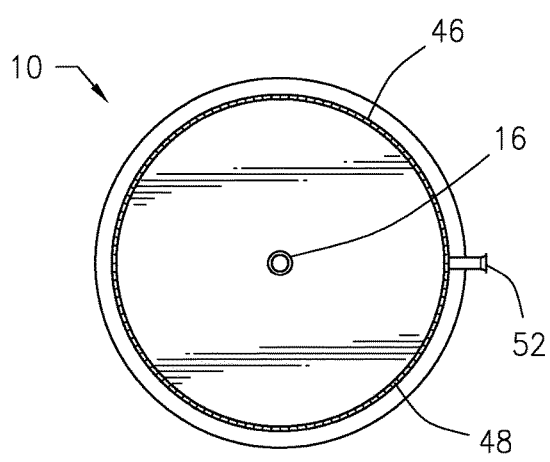
FIG. 2 is a cross sectional view taken along line 2-2 of FIG. 1.
Figure 3:
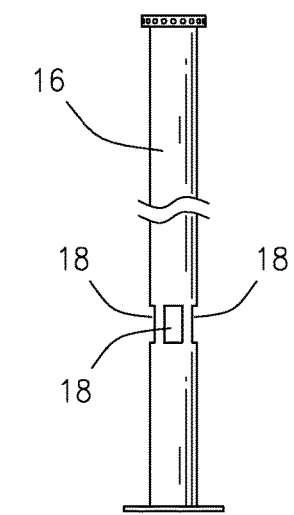
FIG. 3 is a plan view of the central inlet pipe of FIG. 1 that is shown removed from FIG. 6.
Figure 4:
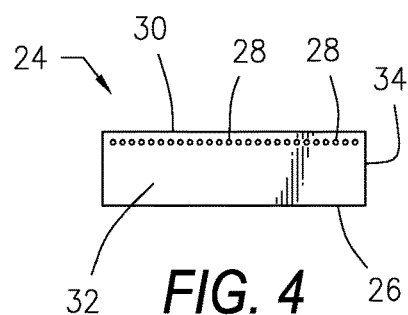
FIG. 4 is a side view of one of the lateral distribution and metering troughs of FIG. 1 that was removed from the horizontal hydraulic distributor of FIG. 6.
Figure 5:
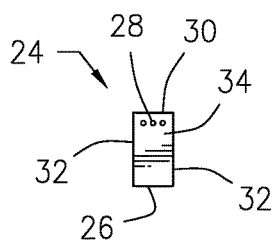
FIG. 5 is an end view of the lateral distribution and metering trough of FIG. 4.

Referring now to the drawings, and initially to FIG. 1, there is illustrated a high efficiency gun barrel tank 10 that is constructed in accordance with a preferred embodiment of the present invention. The tank 10 employs a unique dual phase hydraulics approach to achieve uniform distribution of the crude oil mixture within the tank 10 and uniform collection of the resulting separated crude oil from the tank 10. As in all gun barrels or wash tanks, the inlet fluid in the present tank 10 is first degassed in a degassing boot 12. The crude oil mixture enters the degassing boot 12 via a fluid inlet 13. The degassing boot 12 is located on top 14 of the tank 10 and removes the free gas from the liquids. The free gas exits the degassing boot 12 via a gas outlet 15 provided on the degassing boot 12. The degassing boot 12 communicates with gas located within the top 14 of the tank 10 via a gas equalizing line 17 to equalize pressure between the tank 10 and the degassing boot 12.

As illustrated in FIGS. 1-7, the gas-free liquid then flows vertically down into the tank 10 via a central column 16 and then through distributor openings 18 provided in the central column 16 into a very large horizontal hydraulic distributor 20. This distributor 20 is comprised of a central distributor trough 22 and a series of horizontal inverted lateral troughs 24 that attached to the central distributor trough 22 such that there is fluid communication between the central distributor trough 22 and the lateral troughs 24. Each of the horizontal inverted lateral troughs 24 is open on its bottom 26 and closed on all other sides. Also each lateral trough 24 is provided with metering orifices 28 that are located near the top edges 30 on both sides 32 and on the ends 34 of the lateral trough 24.

The central distributor trough 22 is designed to slow the inlet fluid velocity so uniform distribution into the lateral troughs 24 is achieved. The lateral troughs 24 distribute and meter the fluid through the oil and emulsion distribution metering orifices 28 provided in each lateral trough 24.

The design of the horizontal hydraulic distributor 20 balances flow, internal distribution, and trough interface depression to achieve a uniform pressure drop across the plurality of oil and emulsion distribution metering holes or orifices 28.

The lateral distribution and metering troughs 24 are strategically located in the lower area 36 of the tank 10 in the bottoms sediment and water (BS&W) layer where, during operation, all emulsion breaking chemicals naturally concentrate. Typically, emulsion breaking chemicals are introduced into the incoming stream at a location upstream of the gun barrel tank 10.

The internal trough interface within the lateral troughs 24 is depressed by the proper sizing of the metering orifices 28. This creates a uniform pressure drop across every metering orifice 28, assuring uniform and identical flow through each and every orifice 28. The result is very uniform oil distribution throughout the entire cross section of the gun barrel tank 10.

With uniform distribution accomplished, oil rises vertically and uniformly through the emulsion layer within the tank 10 where coalescing of water droplets can occur. Larger coalesced water droplets fall rapidly downward through the emulsion layer into the water phase located at the lower area 36 of the tank 10.

As illustrated in FIGS. 1 and 8, water is drawn out of the lower area 36 of the tank 10 via a circular water collector manifold 38 that communicates with a water outlet 40 on the tank 10.

Sediment that falls to the bottom 42 of the tank 10 will be periodically pumped off via a solids outlet or manhole 44 provided at the bottom of the tank 10.

The oil rises at the minimum velocity, thus maximizing retention time within the tank 10. The lower rise rate of the oil promotes the separation of smaller water droplets. Larger and heavier water droplets can now counter-flow downward within the tank 10 and into the water layer below, completing the dehydration process to a degree not heretofore thought possible in atmospheric gun barrel tank systems.

Referring again to FIG. 1, as the oil nears the top of the oil layer, it is collected uniformly throughout the entire circumference of the tank 10 employing a circular oil collection trough 46, thus maximizing the utilization of the tank 10 and completing the dehydration process. As shown in detail in FIG. 9, the entire top edge 48 of the circular oil collection trough 46 is in the form of a plurality of adjacent V-shaped notches 50 that insure uniform collection of oil into the oil collection trough from around the entire circumference of the gun barrel tank 10 at a variety of flows. The oil then flows out of the tank 10 via an oil outlet 52 that communicates with the oil collection trough 46.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A fluid separation system, comprising:
   an oil separation tank defining an inlet that is fluidly connectable with a tank interior, the tank interior having a top portion, a middle portion and a bottom portion arranged along a tank longitudinal direction;
   a gas separation device disposed between the inlet of the tank and a source of crude oil mixtures;
   a central column defining a fluid conduit, the central column being fluidly connected to the inlet of the tank and extending into the tank interior across the top and middle portions, the central column having at least one distributor opening disposed along the central column in the middle portion of the oil separation tank;
   a horizontal hydraulic distributor connected to the central column and being fluidly open with the distributor opening, the horizontal hydraulic distributor extending substantially along an entire cross section of the oil separation tank along a plane that is perpendicular to the longitudinal direction of the tank, the horizontal hydraulic distributor comprising at least one lateral trough defined by walls disposed on three sides of a channel, an open side oriented in a downward direction, and an end wall, the walls forming a plurality of metering orifices therein that fluidly connect the interior of the oil separation tank with the fluid conduit of the central column through the distributor opening and the channel;

an oil collection trough disposed in the top portion of the tank interior and extending along a periphery of the oil separation tank along a plane that is perpendicular to the longitudinal direction of the tank; and a water collection manifold disposed in the interior of the tank at the bottom portion of the tank; and a gas equalizing line fluidly connecting the gas separation device and the top portion of the tank interior:

wherein, during operation, a flow of crude oil mixtures provided by the source passes, in sequence, through the gas separation device, the inlet, the conduit defined in the central column, the distributor opening, the channel and the metering orifices to enter the tank interior.

2. The fluid separation system of claim 1, wherein the horizontal hydraulic distributor further comprises:

a central distributor trough attached to the central column and a plurality of lateral troughs connected to the central column through the central distributor trough.

3. The fluid separation system of claim 1, wherein the oil separation tank has a generally cylindrical shape with a circular cross section along the longitudinal axis, and wherein the oil collection trough has a generally circular shape and is disposed adjacent and along a periphery of a cross section of the tank, the oil collection trough forming a channel that is open towards the top and encloses a channel on three sides including a radially inner wall, a radially outer wall, and an longitudinally lower wall, the radially inner wall forming a plurality of spaced v-shaped notches provided along a top edge of the radially inner wall; wherein the channel of the oil collection trough is in fluid communication with an oil outlet provided in the tank through which degassed and dewatered crude oil collected in the channel exits the tank during operation.

4. The fluid separation system of claim 1, wherein said metering orifices are located near top edges of the walls.

5. The fluid separation system of claim 2, wherein the central distributor trough extends diametrically across a tank cross section, wherein each of the plurality of lateral troughs extends perpendicularly relative to the central distributor trough to an area adjacent to an inner periphery of the tank interior along a chord of the inner periphery.

6. The fluid separation system of claim 1, wherein the water collection manifold extends along a tank cross section along the bottom portion of the tank, the water collection manifold extending along an outer periphery of the tank interior and forming a fluid conduit that is fluidly connected with the tank interior via openings formed in a bottom surface of the water collection manifold, the fluid conduit being fluidly connected to a water outlet opening of the tank.

7. The fluid separation system of claim 1, further comprising a solids outlet formed in the tank adjacent the bottom portion.

8. The fluid separation system of claim 1, further comprising a gas outlet connected to the gas separation device.

9. A fluid separation system, comprising:

an oil separation tank defining an inlet that is fluidly connectable with a tank interior, the tank interior having a top portion, a middle portion and a bottom portion arranged along a tank longitudinal direction;

a gas separation device disposed between the inlet of the tank and a source of crude oil mixtures;

a central column defining a fluid conduit, the central column being fluidly connected to the inlet of the tank and extending into the tank interior across the top and middle portions, the central column having at least one distributor opening disposed along the central column in the middle portion of the oil separation tank;

a horizontal hydraulic distributor connected to the central column and being fluidly open with the distributor opening, the horizontal hydraulic distributor extending substantially along an entire cross section of the oil separation tank along a plane that is perpendicular to the longitudinal direction of the tank, the horizontal hydraulic distributor comprising at least one lateral trough defined by walls disposed on three sides of a channel, an open side oriented in a downward direction, and an end wall, the walls forming a plurality of metering orifices therein that fluidly connect the interior of the oil separation tank with the fluid conduit of the central column through the distributor opening and the channel;

an oil collection trough disposed in the top portion of the tank interior and extending along a periphery of the oil separation tank along a plane that is perpendicular to the longitudinal direction of the tank; and a water collection manifold disposed in the interior of the tank at the bottom portion of the tank;

wherein, during operation, a flow of crude oil mixtures provided by the source passes, in sequence, through the gas separation device, the inlet, the conduit defined in the central column, the distributor opening, the channel and the metering orifices to enter the tank interior;

wherein the oil separation tank has a generally cylindrical shape with a circular cross section along the longitudinal axis;

wherein the oil collection trough has a generally circular shape and is disposed adjacent and along a periphery of a cross section of the tank, the oil collection trough forming a channel that is open towards the top and encloses a channel on three sides including a radially inner wall, a radially outer wall, and an longitudinally lower wall, the radially inner wall forming a plurality of spaced v-shaped notches provided along a top edge of the radially inner wall; and wherein the channel of the oil collection trough is in fluid communication with an oil outlet provided in the tank through which degassed and dewatered crude oil collected in the channel exits the tank during operation.

10. The fluid separation system of claim 9, wherein the horizontal hydraulic distributor further comprises:

a central distributor trough attached to the central column and a plurality of lateral troughs connected to the central column through the central distributor trough.

11. The fluid separation system of claim 9, further comprising:

a gas equalizing line fluidly connecting the gas separation device and the top portion of the tank interior.

12. The fluid separation system of claim 9, wherein said metering orifices are located near top edges of the walls.

13. The fluid separation system of claim 10, wherein the central distributor trough extends diametrically across a tank cross section, wherein each of the plurality of lateral troughs extends perpendicularly relative to the central distributor trough to an area adjacent to an inner periphery of the tank interior along a chord of the inner periphery.

14. The fluid separation system of claim 9, wherein the water collection manifold extends along a tank cross section along the bottom portion of the tank, the water collection manifold extending along an outer periphery of the tank interior and forming a fluid conduit that is fluidly connected with the tank interior via openings formed in a bottom surface of the water collection manifold, the fluid conduit being fluidly connected to a water outlet opening of the tank.

15. The fluid separation system of claim 9, further comprising a solids outlet formed in the tank adjacent the bottom portion.

16. The fluid separation system of claim 9, further comprising a gas outlet connected to the gas separation device.

* * * * *